United States Patent [19]
Oslakovic

[11] Patent Number: 6,072,127
[45] Date of Patent: Jun. 6, 2000

[54] INDIRECT SUSPENDED LOAD WEIGHING APPARATUS

[75] Inventor: Frank E. Oslakovic, Oak Lawn, Ill.

[73] Assignee: General Electric Company, Schenectady, N.Y.

[21] Appl. No.: 09/133,636

[22] Filed: Aug. 13, 1998

Related U.S. Application Data

[60] Provisional application No. 60/086,203, May 21, 1998.

[51] Int. Cl.[7] .......................... G01G 19/08; G01G 19/14; G01G 19/22
[52] U.S. Cl. .......................... 177/136; 177/147; 702/44; 702/174; 702/175
[58] Field of Search .................. 702/44, 173, 174, 702/175; 177/25.11, 25.13, 136, 147

[56] References Cited

U.S. PATENT DOCUMENTS

| | | | |
|---|---|---|---|
| 2,858,070 | 10/1958 | Scharff | 702/174 |
| 3,934,126 | 1/1976 | Zalesov et al. | 235/150.2 |
| 4,035,621 | 7/1977 | Kemp | 235/151.3 |
| 4,228,681 | 10/1980 | Purex | 702/174 |
| 4,499,960 | 2/1985 | Ehrich et al. | 177/25.11 |
| 4,627,013 | 12/1986 | Ichiyama et al. | 364/567 |
| 4,677,579 | 6/1987 | Radomilovich | 364/567 |
| 4,809,794 | 3/1989 | Blair et al. | 177/139 |
| 5,027,303 | 6/1991 | Witte | 702/44 |
| 5,220,968 | 6/1993 | Weber | 177/25.14 |
| 5,321,637 | 6/1994 | Anderson et al. | 364/567 |
| 5,345,042 | 9/1994 | Jamieson | 177/25.13 |

OTHER PUBLICATIONS

GE Drive Motors and Generators, SPM–8000 Product Literature, Apr. 1987.
General Electric Company, DIGMATE® Plus Product Literature.

*Primary Examiner*—Randy W. Gibson
*Attorney, Agent, or Firm*—Senniger, Powers, Leavitt & Roedel; Damian Wasserbauer

[57] ABSTRACT

An indirect suspended load weight measuring system that is suitable for use with an excavator that has a moving load bucket rotating about a swing axis. The load bucket has a load therein, and the excavator has a swing drive motor for rotating the bucket, and a hoist rope for supporting the load bucket. The system comprises a torque determination circuit for determining a torque of the swing drive motor and for outputing a motor torque signal having a parameter representative of an instantaneous motor torque. A radius sensing circuit senses a radius of the load bucket with respect to the swing axis and provides a radius signal. A speed sensing circuit determines an angular speed of the load bucket with respect to the swing axis and provides an angular speed signal. A computation circuit responsive to the instantaneous torque signal, the radius signal and the angular speed signal, computes a weight of the moving load.

31 Claims, 6 Drawing Sheets

INDIRECT SUSPENDED LOAD WEIGHING APPARATUS

CROSS REFERENCE TO RELATED APPLICATIONS

The invention of the present application claims priority based on Provisional Application Ser. No. 60/086,203, filed on May 21, 1998.

FIELD OF THE INVENTION

The invention generally relates to indirect suspended load weighing systems and particularly relates to a system for determining a load weight by measuring an angular momentum of a rotating or swinging load.

BACKGROUND OF THE INVENTION

Modern large scale excavators are capable of moving enormous amounts of material during each load cycle. For example, it is common for excavators to move loads weighing in excess of two hundred tons. Large scale excavators are often used in the mining industry, but also find application in other earth moving applications, such as sand pits.

There are several types of large scale excavators. For example, one common large scale excavator is the so-called dragline excavator. Another example is the shovel type excavator. Those skilled in the art will be familiar with the general operation of these and similar excavators.

Efficiency and productivity are extremely important in large scale excavation projects. Efficiency is often determined by the weight of the material moved per dig cycle. Of course, the actual weight of material loaded during any given dig cycle varies. Hence, it is important to know the weight of the material moved during each dig cycle.

Likewise, concerns for equipment and safety make it equally important to know the weight of the material loaded. For obvious reasons, it is undesirable to exceed the load weight limitation of an excavator. Similarly, loss of productivity due to equipment problems may prove extremely costly.

In response to these concerns for productivity, efficiency, and equipment operability, several systems and methods have been developed to either directly or indirectly measure the weight of a suspended load in an excavator bucket. Indirect systems monitor parameters such as motor power, rope length and bucket geometry to estimate the weight of the load. Examples of prior art systems include DIGIMATE®/Plus production monitoring system and the BOOMSETNRY®/Plus antitightline system, both of which are manufactured and sold by General Electric, the assignee of the current application.

Common to many indirect load measuring systems are means for determining the three dimensional position of the suspended load. With dragline and shovel type excavators, the position in space of a suspended load is determined by three independent operator controlled motion drives. First, a hoist drive raises or lowers the suspended load. Second, a drag/crowd drive moves the suspended load in or out (relative horizontal movement). Finally, a swing drive rotates the structure and the suspended load from side to side about a centerline of swing or swing axis.

Figure 1:
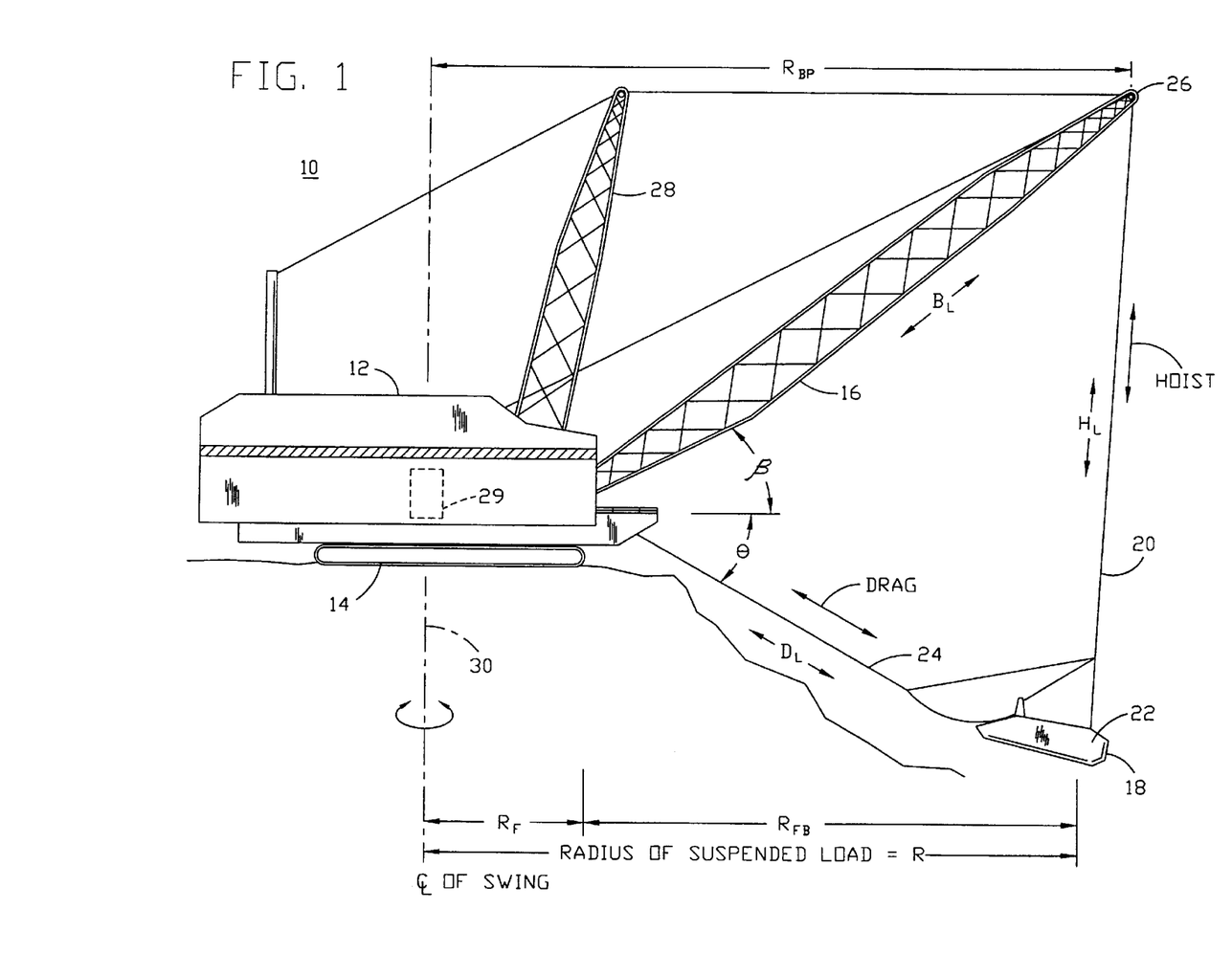
FIG. 1 is a geometric diagram of a dragline excavator suitable for use with an indirect load weighing system according to the present invention.
Figure 2:
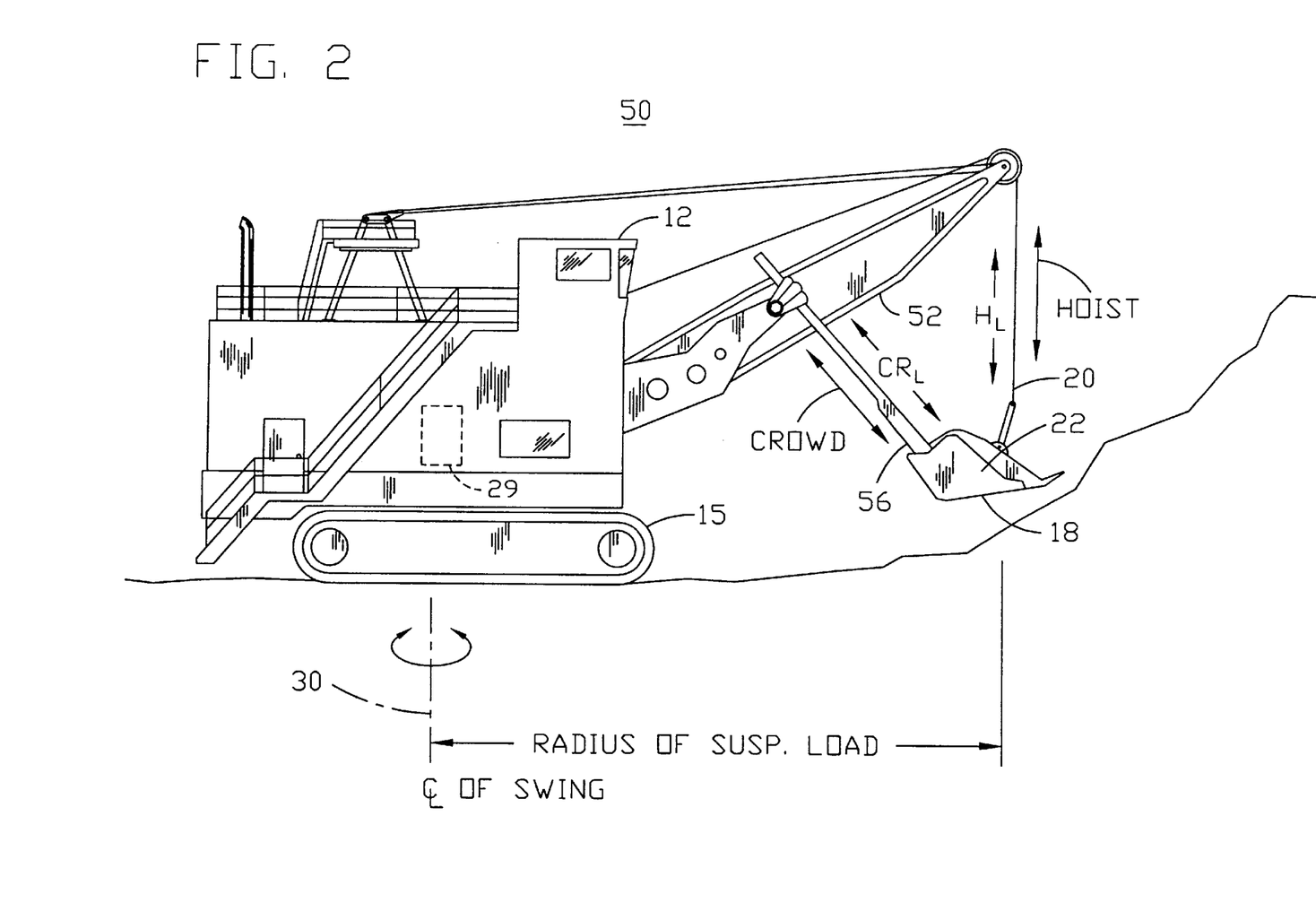
FIG. 2 is a geometric diagram of a shovel excavator suitable for use with an indirect load weighing system according to the present invention.

Those skilled in the art will recognize that while the hoist and drag/crowd motion drives are independently controlled, the motion of one drive affects the load reflected to the other motion drive due to the geometrical relationship of the structure, the ropes and the suspended load. Moreover, when the swing drive rotates the excavator, the suspended load should be constrained to an essentially circular path. This is accomplished by the hoist and drag/crowd motion drives. FIGS. 1 and 2, discussed in more detail below, provide examples of typical dragline and shovel type excavators and may be helpful in understanding the geometric relationships between the hoist, drag/crowd and swing motion drives.

There is no economically practical method to directly measure the pull in the ropes on a large mining excavator. Earlier indirect load systems measured hoist and drag motion drive DC motor armature currents and attempted to calculate motor output torque with sufficient accuracy. The earlier attempts with drives that operated at constant motor field strengths when lifting a suspended load employed torque per armature ampere "constants" to calculate torque. In reality, these "constants" were not quite constant. Further, these earlier methods prove inadequate for use with more modern constant horsepower hoist and drag/crowd drives. These modern drives operate at variable motor field strengths. Subsequently, methods emerged to calculate the torque per armature ampere as a function of motor field strength (i.e., motor magnetic flux).

In prior art indirect load measuring systems, once hoist and drag motor torques are determined, the system must properly account for the torques required to accelerate the suspended load. Prior art methods limited armature current observations to time periods when hoist and drag/crowd drive speeds were nearly constant and ignored acceleration torques. Unfortunately, even with constant rope speeds, the suspended load still changes direction as it moves to the boom point thereby requiring accelerating rope pulls. Additionally, hoist and drag rope pulls are required to constrain the suspended load to a circular path when the excavator rotates or swings. These centripetal rope pulls are a function of swing speed and suspended load weight. Moreover, prior art indirect load measuring systems typically ignore these centripetal rope pulls.

One overwhelming challenge of any scheme utilizing hoist and drag/crowd drive torques is in accurately allocating to each drive the acceleration torques that exist for both the drive machinery and the suspended load. The system must then geometrically resolve the remaining static pull torques for each drive into vertical rope pull components equal to the weight of the suspended load.

There is a need for an indirect suspended load measuring system that eliminates the difficulty in properly allocating acceleration and static load torques between the hoist and drag/crowd drives. There is also a need for an indirect load measuring system that requires motor torque calculations for only a swing drive motor. There is further a need for a system having an accuracy that exceeds that of the prior art.

SUMMARY OF THE INVENTION

It is therefore seen to be desirable to provide an improved and highly accurate indirect suspended load weighing system for use with excavators. Thus, it is further desirable to provide an indirect load measuring system that eliminates the difficulty in properly allocating acceleration and static load torques between the hoist and drag/crowd drives. It is also desirable to provide an indirect load measuring system that requires motor torque calculations for only the swing drive motor. It is desirable to provide an indirect load measuring system that accounts for the angular acceleration of the suspended load. It is further desirable to provide an indirect suspended load weighing system that accounts for the variable angular momentum of a suspended load. It is likewise desirable to provide an indirect suspended load weighing system that accounts for the variable moment of inertia of a rotating load. It is also desirable to provide such a system that accounts for the variable inertia of the ropes associated with the excavator. It is desirable to provide an improved indirect suspended load weighing system that can be retrofit into existing excavators. It is also desirable to provide an indirect suspended load weighing system that works with dragline, shovel type and other large scale excavators.

The invention comprises an indirect suspended load weight measuring system suitable for use with an excavator having a moving load bucket rotating about a swing axis. The load bucket has a load therein, and the excavator has a swing drive motor for rotating the bucket, and a hoist rope for supporting the load bucket. A torque determination circuit determines a torque of the swing drive motor and outputs a motor torque signal having a parameter representative of an instantaneous motor torque. A radius sensing circuit senses a radius of the load bucket with respect to the swing axis and provides a radius signal. A speed sensing circuit determines an angular speed of the load bucket with respect to the swing axis and provides an angular speed signal. A computation circuit responsive to the instantaneous torque signal, the radius signal and the angular speed signal, computes a weight of the moving load.

The invention also comprises an indirect suspended load weight measuring system suitable for use with an excavator having a moving load bucket rotating about a swing axis. The load bucket has a load therein, and the excavator has a swing drive motor for rotating the bucket, and a hoist rope for supporting the load bucket. A torque determination circuit determines an instantaneous torque of the swing drive motor and outputs a motor torque signal having a parameter representative of the instantaneous motor torque. A radius sensing circuit senses a radius of the load bucket with respect to the swing axis, and provides a first radius signal at a first point during rotation of the bucket, and provides a second radius signal at a second point during rotation of the bucket. A speed sensing circuit determines an angular speed of the load bucket with respect to the swing axis. The speed sensing circuit provides a first angular speed signal at the first point during rotation of the bucket, and provides a second angular speed signal at the second point during rotation of the bucket. A computation circuit computes a weight of the load as a function of the instantaneous torque signal, the first and second radius signals, and the first and second angular speed signals.

The invention also comprises an indirect suspended load weight measuring system suitable for use with an excavator having a moving load bucket rotating about a swing axis. The load bucket has a load therein, and the excavator has a swing drive motor for rotating the bucket. A rope having a variable extended length supports the load bucket. A torque determination circuit determines a torque of the swing drive motor and outputs a motor torque signal having a parameter representative of an instantaneous motor torque. A radius sensing circuit senses a radius of the load bucket with respect to the swing axis and provides a radius signal. A speed sensing circuit determines an angular speed of the load bucket with respect to the swing axis and provides an angular speed signal. A computation circuit responsive to the instantaneous torque signal, the radius signal and the angular speed signal, computes a weight of the moving load as a function of a variable inertia of the extended lengths of the rope.

The invention also comprises an indirect suspended load weight measuring system suitable for use with an excavator having a moving load bucket rotating about a swing axis. The load bucket has a load therein, and the excavator has a swing drive motor for rotating the bucket, and a hoist rope for supporting the load bucket. Torque determination means determines a torque of the swing drive motor and outputs a motor torque signal having a parameter representative of an instantaneous motor torque. Radius sensing means senses a radius of the load bucket with respect to the swing axis and provides a radius signal. Speed sensing means determines an angular speed of the load bucket with respect to the swing axis and provides an angular speed signal. Computation means responsive to the instantaneous torque signal, the radius signal and the angular speed signal, computes a weight of the moving load as a function of a variable angular momentum of the moving load.

The invention also comprises an indirect suspended load weight measuring system suitable for use with an excavator having a moving load bucket rotating about a swing axis. The load bucket has a load therein, and the excavator has a swing drive motor for rotating the bucket, and a hoist rope for supporting the load bucket. Torque determination means determines an instantaneous torque of the swing drive motor and outputs a motor torque signal having a parameter representative of the instantaneous motor torque. Radius sensing means senses a radius of the load bucket with respect to the swing axis. The radius sensing means provides a first radius signal at a first point during rotation of the bucket, and provides a second radius signal at a second point during rotation of the bucket. Speed sensing means determines an angular speed of the load bucket with respect to the swing axis. The speed sensing means provides a first angular speed signal at the first point during rotation of the bucket, and provides a second angular speed signal at the second point during rotation of the bucket. Computation means computes a weight of the load as a function of the instantaneous torque signal, the first and second radius signals, and the first and second angular speed signals.

The invention also comprises an indirect suspended load weight measuring system suitable for use with an excavator having a moving load bucket rotating about a swing axis. The load bucket has a load therein, and the excavator has a drive motor for moving the bucket, and a hoist rope for supporting the load bucket. A torque determination circuit determines a torque of the drive motor and outputs a motor torque signal having a parameter representative of an instantaneous motor torque. A radius sensing circuit senses a radius of the load bucket with respect to the swing axis and provides a radius signal. A speed sensing circuit determines an angular speed of the load bucket with respect to the swing axis and provides an angular speed signal. A computation circuit responsive to the instantaneous torque signal, the radius signal and the angular speed signal, computes a weight of the moving load as a function of a variable angular momentum of the moving load.

BRIEF DESCRIPTION OF THE DRAWINGS

Corresponding reference characters are intended to indicate corresponding parts throughout the drawings.

DETAILED DESCRIPTION OF PREFERRED EMBODIMENTS

Referring now to FIG. 1 which shows a side view of a dragline excavator 10 suitable for use with an indirect suspended load weighing system according to the present invention. Those skilled in the art will recognize that there are many variations between excavators, FIG. 1 provides an example of one possible excavator that is suitable for use with the present invention.

The dragline excavator 10 comprises a main housing 12 mounted on a tub 14. A dragline boom 16, having a boom length $B_L$, is mounted to the front of the excavator 10. The mounting angle of dragline boom 16 establishes a dragline boom angle β. Boom angle β is measured relative to horizontal and is typically fixed, that is, the boom does not raise or lower.

The dragline boom 16, in turn, supports a load bucket 18 via a hoist rope 20. The load bucket 18 carries a load 22. Load bucket 18 and load 22 comprise a suspended load. The hoist rope is mounted such that it traverses a roller or pulley 26 at the top/end of the dragline boom 16 and is connected at the other end to a hoist rope drum (not shown). The hoist rope drum is mounted inside the excavator housing. A drag rope 24 is attached to the load bucket 18 on one end, and to a drag rope drum (not shown) at the other end. The drag rope drum is mounted inside the excavator housing 12. A dragline rope angle θ reflects the angle of the dragline rope 24 with respect to horizontal. A support tower 28 is mounted to the excavator housing 12 and provides additional structural support for the dragline boom 16.

Enclosed within the main housing 12 are motors (not shown) for driving the hoist rope drum and drag rope drum. Further enclosed is an operator compartment that includes necessary operator controls. A computer or electronic control system is likewise typically enclosed in the main housing 12. Further, a swing drive motor 29 is enclosed within the housing 12. The swing drive motor 29 allows for the main housing 12 to rotate about a swing axis 30 while the tub 14 remains stationary.

The hoist rope 20 has a variable extended length $H_L$. The extended length $H_L$ is varied by operation of the hoist rope drum. The drum extends or retracts the hoist rope 20 in response to the hoist rope motor. Likewise, the drag rope 24 has a variable extended length $D_L$. The drag rope extended length $D_L$ is varied by the drag rope drum in response to the drag rope motor.

As mentioned above, the dragline boom angle β is typically fixed. Therefore, as the length $H_L$ of the hoist rope 20 and/or the length $D_L$ of the drag rope 24 vary, the dragline rope angle θ increases or decreases accordingly. Similarly, the radius of the suspended R load varies.

The radius R of the suspended load comprises two components. The first component $R_F$ is fixed and reflects the radius from the swing axis 30 to the front of the main housing 12. $R_F$ is commonly referred to in the art as the radius from the swing axis 30 to the drag rope "fairlead". The second component $R_{FB}$ is variable and reflects the radius from the front of the main housing 12 to the load bucket 18 (radius from fairlead to bucket). Also shown in FIG. 1 is a radius $R_{BP}$ from the swing axis 30 to the end of the boom 26.

In the embodiment shown in FIG. 1, the extended length $H_L$ of hoist rope 20 and the extended length $D_L$ of the drag rope 24 are determined from measurements taken by position transducers or resolvers associated with the hoist and drag drum machinery mounted inside the main housing 12. The extended lengths $H_L$ and $D_L$ are used to calculate the radius of the suspended load per equations 1 through 3 below.

$$\theta = \left\{ ARCCOS \frac{B_L^2 + D_L^2 - H_L^2}{2 * B_L * D_L} \right\} - \beta \quad [1]$$

$$R_{FB} = D_L * COS\theta \quad [2]$$

$$\text{Radius of Suspended Load} = R_{FB} + R_F \quad [3]$$

FIG. 2 shows a side view of a shovel excavator 50 suitable for use with an indirect load weighing system according to the present invention. The shovel excavator 50 comprises a boom 52 attached to a main housing 12. The main housing 12 is mounted on a track drive 15. The main housing 12 further encloses a swing drive motor 29. The swing drive motor 29 allows for the main housing 10 to rotate about a swing axis 30 while the track drive 15 remains stationary.

A hoist rope 20 is connected at one end to a load bucket 18, and at the other end to a hoist rope drum (not shown) that is mounted internal to the main housing 12. The hoist rope 20 has an extended length $H_L$. A crowd arm 56 is also attached to the load bucket 18. The crowd arm 56 has an extended length $CR_L$. The load bucket 18 is suitable for collecting and transporting a load 22.

Those skilled in the art of excavation equipment will recognize that operation of a typical excavator (i.e., a dragline excavator 10, a shovel excavator 50, or other variety of excavator) includes three distinct phases: 1) loading or digging; 2) rotating or swinging; and 3) unloading or dropping. In the case of a dragline excavator, the operator extends the hoist rope 20 and drag rope 24 to position the load bucket 18 in contact with material to be loaded. The operator then retracts the drag rope 24 and extends hoist rope 20 to fill the load bucket 18 with the load 22. Once full, the hoist rope 20 is further retracted, and the drag rope 24 extended, to allow the load bucket 18 to clear any obstacles. The operator then engages the swing drive motor 29 to rotate the housing 12, which in turn causes the load bucket 18 and load 22 to rotate about the swing axis 30. Hoisting and swinging often occur simultaneously. When the load bucket 18 is positioned above a suitable site, the load 22 is unloaded. It is during this swing phase that the preferred embodiment of the present invention calculates the weight $W_{load}$ of the load 22.

The load weight $W_{load}$ is calculated over an observation period and accounts for the acceleration of the load during that observation period. Due to forces acting upon the bucket and its contents during rotation, the suspended load has a variable radius during the measurement period. The system inertia WKSQ is sufficiently large such that acceleration occurs over a several second observation period. In practice, the total moment of inertia about the swing axis 30 may be comprised of two components: 1) a constant component $WKSQ_{mach}$ that accounts for the inertia of the machinery and structure; and 2) a variable inertia that accounts for the load weight $W_{load}$ of load 22 and the variable radius of the suspended load. Further improvements in accuracy are possible if the system accounts for the variable inertia of the extended lengths of the hoist and drag ropes 20 and 24. The inertia of the ropes is discussed in detail below.

One advantage of the indirect load weighing system of the present invention is that it accounts for the change in total angular momentum of the excavator.

Angular momentum equals the moment of inertia (i.e., $(WK)^2$) multiplied by angular speed. An Appendix provides examples of calculations suitable for carrying out a preferred embodiment of the present invention.

Advantageously, the motor torque need not be uniform during the observation period. Indeed, it may be intermittent or even reversible. This changing torque is stored as a torque history during the observation period.

Moreover, the system moment of inertia WKSQ may change during the observation period. The system angular momentum at the end of the observation period will be consistent with the system angular momentum at the beginning of the observation period and the accumulated torque history during the observation period.

The indirect suspended load weighing system calculates the weight of the suspended load $W_{sld}$ that equals the load weight $W_{load}$ plus the weight $W_{bkt}$ of the load bucket 18. Hence, the Load weight $W_{load}$ equals the weight of the suspended load $W_{sld}$ less the bucket weight $W_{bkt}$. The weight of the suspended load $W_{sld}$ is determined from measured quantities. The bucket weight $W_{bkt}$ is a known constant and may be determined as shown by the equations in the Appendix. The instantaneous torque TQ of the swing drive motor equals the instantaneous electrical power available to create torque, divided by the swing drive motor instantaneous speed. Those skilled in the art will recognize that there are many ways to determine motor instantaneous speed, such as, for example, monitoring a tachometer signal representing the motor shaft speed.

Motor instantaneous electrical power available to create torque equals motor instantaneous input power minus motor instantaneous electrical losses. Motor electrical losses may be determined by motor loss algorithms and programmed into the indirect load weighing system accordingly. Motor electrical losses are a function of measured line amps and measured motor speed. Motor instantaneous input power may be derived by measuring the instantaneous line voltage and current supplied to the motor, and, if an AC motor is utilized, the power factor. Advantageously, DC motor field strength, which may vary during the observation period, and magnetic saturation characteristics need not be utilized in the torque calculation.

Instantaneous torque available to change system angular momentum equals motor instantaneous torque TQ less the torque required to provide for system mechanical friction and windage losses. Such losses are determined by known mechanical loss algorithms and may be programmed, modeled, or otherwise accounted for within the indirect load weighing system of the present invention. The system mechanical losses are a function of measured motor shaft speed and calculated motor torque.

The system momentum at the time of an observation equals the sum of the instantaneous torques applied to the system integrated over the observation time and the system momentum at the beginning of the observation period.

The voltage, current and speed of the swing drive motor can be measured directly with a great deal of precision. The accuracy of the indirect load weighing system, therefore, depends in large measure upon the accuracy of the electrical and mechanical loss algorithms employed by the system. The dominant electrical loss results from motor resistance; motor resistance varies as a function of temperature. Many forms of temperature compensation exist and will vary depending upon the type of motor actually utilized.

As shown in FIG. 1, one preferred embodiment of the indirect load weighing system is for use with a dragline type excavator 10. It is a further preferred embodiment that the dragline excavator 10 employ DC motors for use with the swing drive 29, hoist drum and drag drum. When the suspended load is rotated from the load position to the dump position, the swing drive motor 29 accelerates the suspended load from zero speed and then decelerates the suspended load to zero speed. In a preferred embodiment of the indirect load weighing system, the resistance loss algorithm employed determines armature circuit resistance from the ratio of measured DC source voltage and measured DC source current at a time when the motor speed is near zero. At the time when the motor speed is near zero, the DC motor counter electromotive force (CEMF) is also nearly equal to zero. Further, using the DC source voltage accounts for armature circuit cable resistance, brush resistance and armature resistance at the operating temperature existing at the time of measurement. Advantageously, this approach for determining armature circuit resistance provides accuracy at all operating temperatures because the voltage and current measurements are taken at present operating temperature.

Figure 3A:
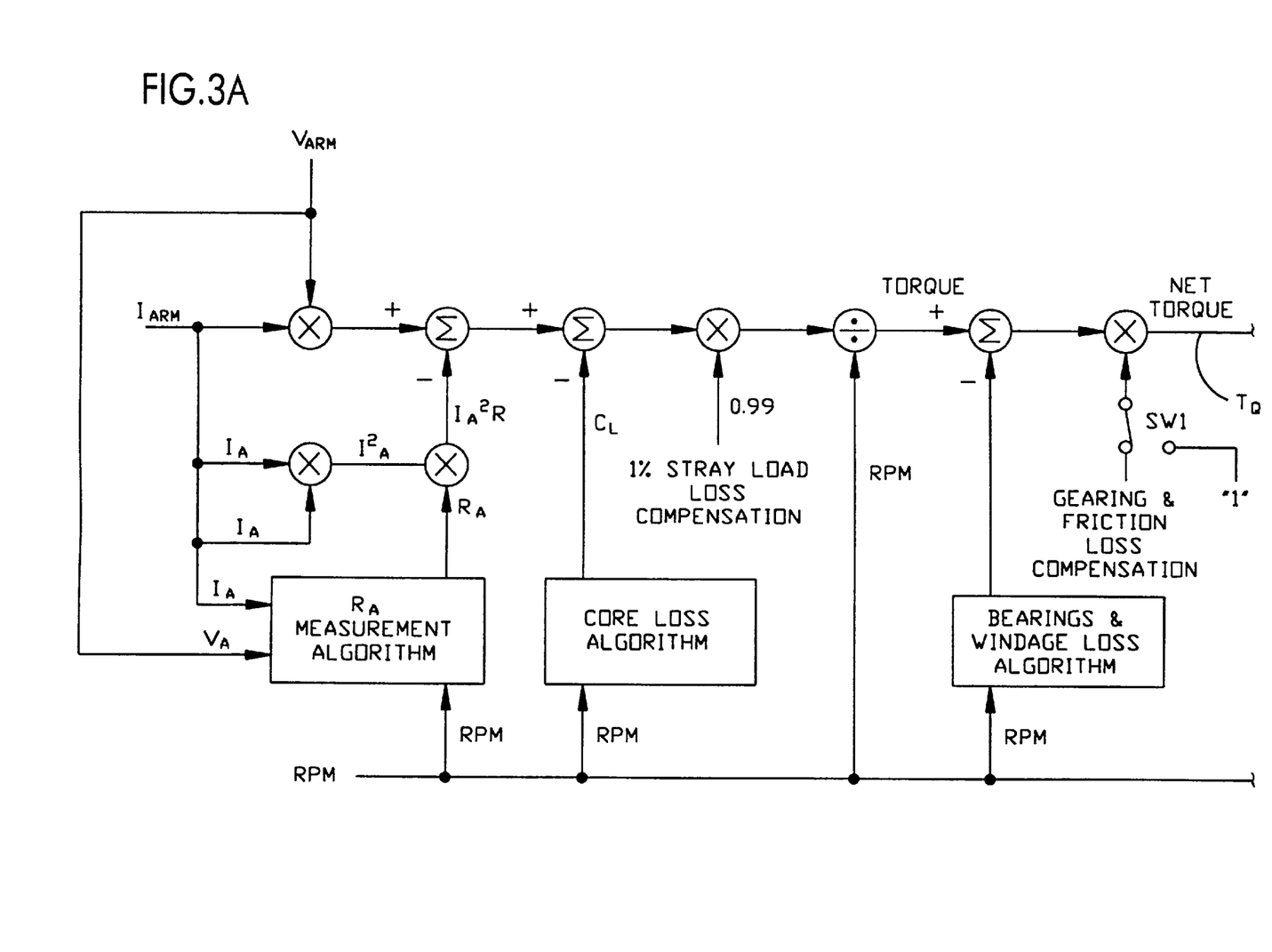
FIGS. 3A and 3B are control system diagram of a preferred embodiment of an indirect load weighing system according to the present invention.
Figure 3B:
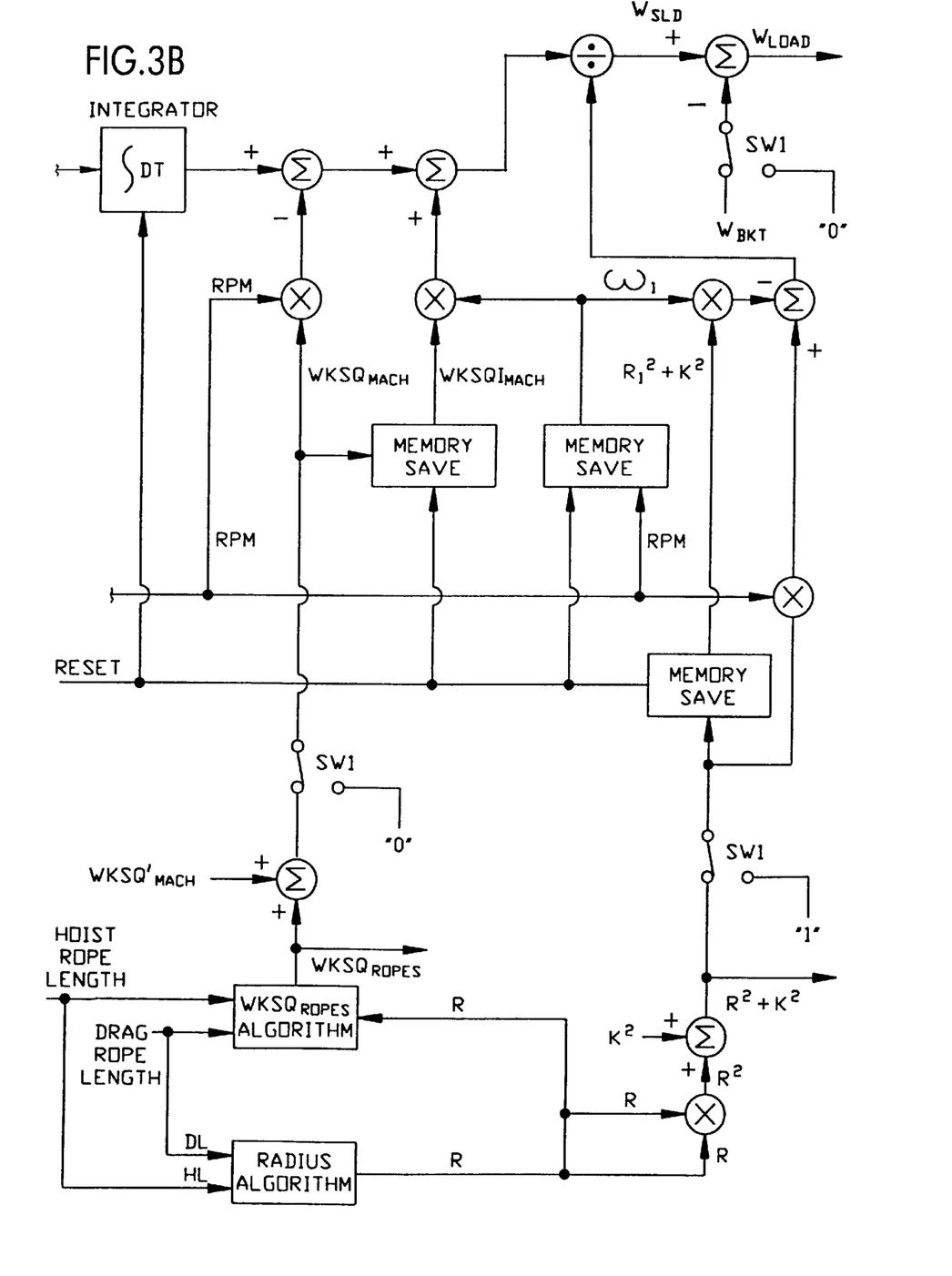

Referring now to FIGS. 3A and 3B which provide a control system diagram for a preferred embodiment of an indirect suspended load weighing system according to the present invention. Starting at the rightmost portion of FIG. 3A, the load weight $W_{load}$ equals the total suspended load weight $W_{sld}$ minus the bucket weight $W_{bkt}$ (a known value). $W_{sld}$ is determined according to equation 4:

$$W_{sld} = \frac{\int TQ * dt - [(WKSQ_{mach}) * (\omega_2 - \omega_1)]}{[(R_2)^2 + K^2] * \omega_2 - [(R_1)^2 + K^2] * \omega_1} \quad [4]$$

TQ is the net swing drive torque and is integrated over the observation period. $WKSQ_{mach}$ is the moment of inertia of the machinery and structure referred to the speed of the suspended load and may be a constant. $R_1$ reflects the radius of the suspended load at the start of the observation period. Likewise, $\omega_1$ is the angular speed (RPM) of the suspended load with respect to the swing axis at the start of the observation period. $R_2$ reflects the radius of the suspended load at the end of the observation period; $\omega_2$ is the angular speed at the end of the observation period. K reflects the radius of gyration of the load bucket 18.

In the preferred embodiment shown in FIGS. 3A and 3B, $WKSQ_{mach}$ is not constant, but rather accounts for the variable inertia of the extended lengths of the hoist and drag ropes 20 and 21. Equation 5 reflects this variable inertia.

$$W_{sld} = \frac{\int TQ * dt - [(WKSQ2_{mach}) * \omega_2 - (WKSQ1_{mach}) * \omega_1]}{[(R_2)^2 + K^2] * \omega_2 - [(R_1)^2 + K^2] * \omega_1} \quad [5]$$

$WKSQ1_{mach} = WKSQ_{mach}' + WKSQ1_{ropes}$ $WKSQ2_{mach} = WKSQ_{mach}' + WKSQ2_{ropes}$ In equation 5, $WKSQ1_{mach}$ represents the moment of inertia of the machinery determined at a first time or point during rotation of the bucket (i.e., the beginning of an observation period). $WKSQ_{mach}'$ is a moment of inertia of the machinery not including the variable inertia of the extended lengths of the hoist and drag ropes. $WKSQ2_{mach}$ represents the moment of inertia of the machinery determined at a second time or point during rotation of the bucket. WKSQ1$_{ropes}$ and WKSQ2$_{ropes}$ reflect the combined moments of inertia of the extended lengths of the hoist and drag ropes computed at the first and second times/points respectively. The appropriate value for WKSQ$_{ropes}$ may be determined as shown in equations 20–22 in the Appendix.

FIGS. 3A and 3B further show a RESET signal. The RESET signal commands the system to store the radius of the suspended load R$_1$ and the angular speed of the swing drive motor ω$_1$ at the start of the observation period. The RESET signal also provides the time reference necessary to determine the integral of the swing drive motor torque. Note that the length of the observation period need not be fixed. Only the start of the observation period is determined by the RESET signal. R$_2$ and ω$_2$ may be measured at any time after the RESET signal is applied. Thus, the length of the observation period may vary as circumstances require. A fixed observation period may be chosen for simplicity. Likewise an operator selectable or computer controlled period may be desirable.

In FIGS. 3A and 3B, net torque TQ equals the instantaneous calculated torque less bearing and windage losses times gearing and friction loss compensation. The instantaneous calculated torque may be determined as shown in equation 6 below:

$$Torque = \frac{[(V_A * I_A - I_A^2 * R_A) - C_L] * \text{Stray Load Loss}}{\omega} \quad [6]$$

Stray Load Loss Factor = 0.99

V$_A$ is the measured armature voltage of the swing drive motor. I$_A$ is the measured armature current of the swing drive motor. I$_A^2$R$_A$ reflects the motor losses discussed above. R$_A$ is the computed swing drive motor armature resistance, the calculation of which is also described above.

Figure 5:
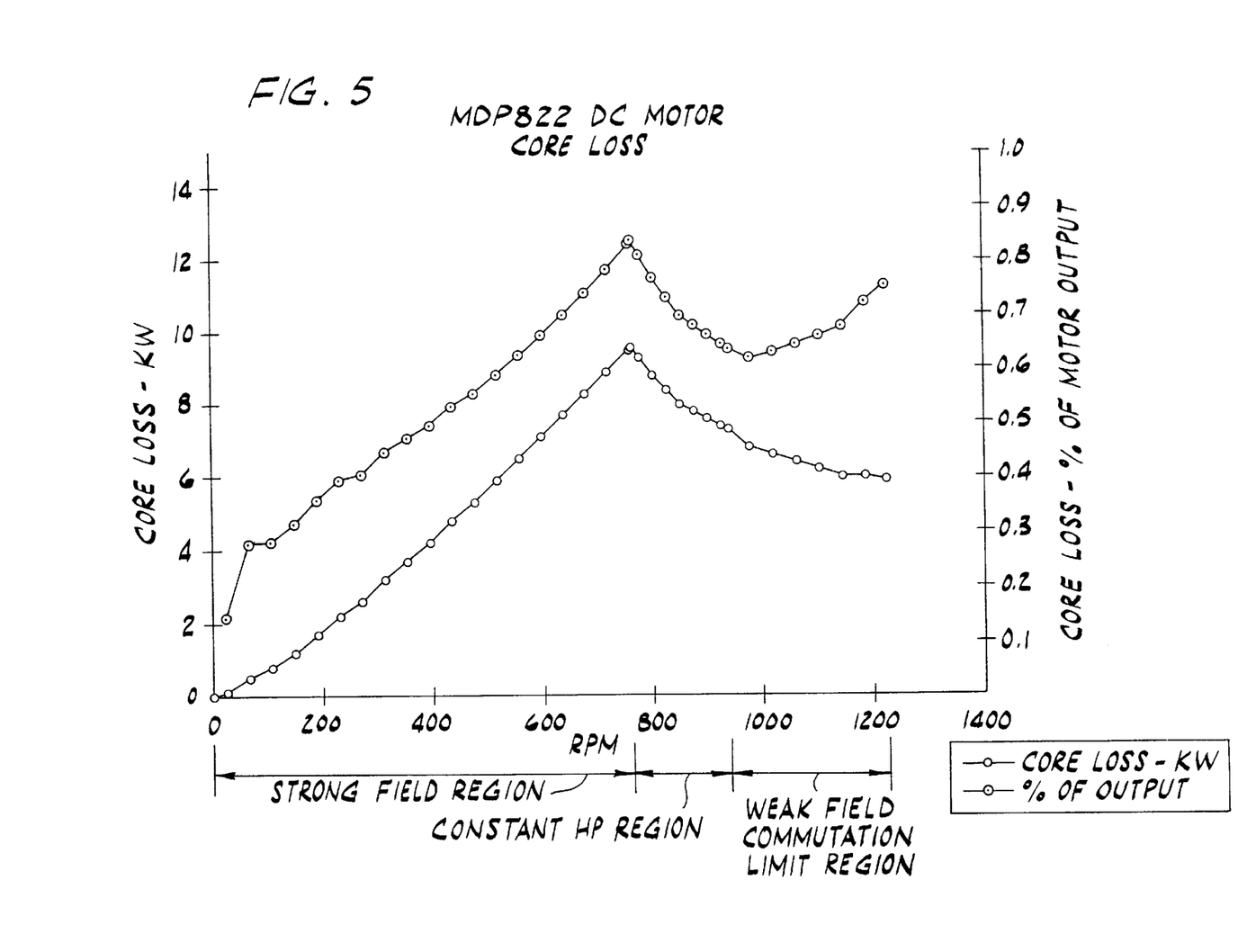
FIG. 5 is graph of DC motor Core Loss versus motor speed for one particular type of motor.

Core Loss, C$_L$, and Stray Load Loss reflect system losses and improve the accuracy of the measurement. Core Loss C$_L$ is the power expended due to hysteresis and eddy currents in the motor magnetic laminations. The Core Loss C$_L$ in kilowatts is a non-linear function of motor speed. The functional relationship is determined from motor test data. Core Loss power typically varies from 0.2% to 0.8% of motor output depending on speed. FIG. 5 provides a graphic depiction of Core Loss C$_L$ versus motor speed. Because this data is motor specific, FIG. 5 is provided for illustrative purposes only.

Stray Load Loss is the power expended due to eddy currents in armature conductors and increased hysteresis losses in armature teeth caused by flux created by armature conductor (i.e., load) current. This loss cannot be directly measured and test codes calculate this loss at one percent (1%) of motor output.

Figure 4:
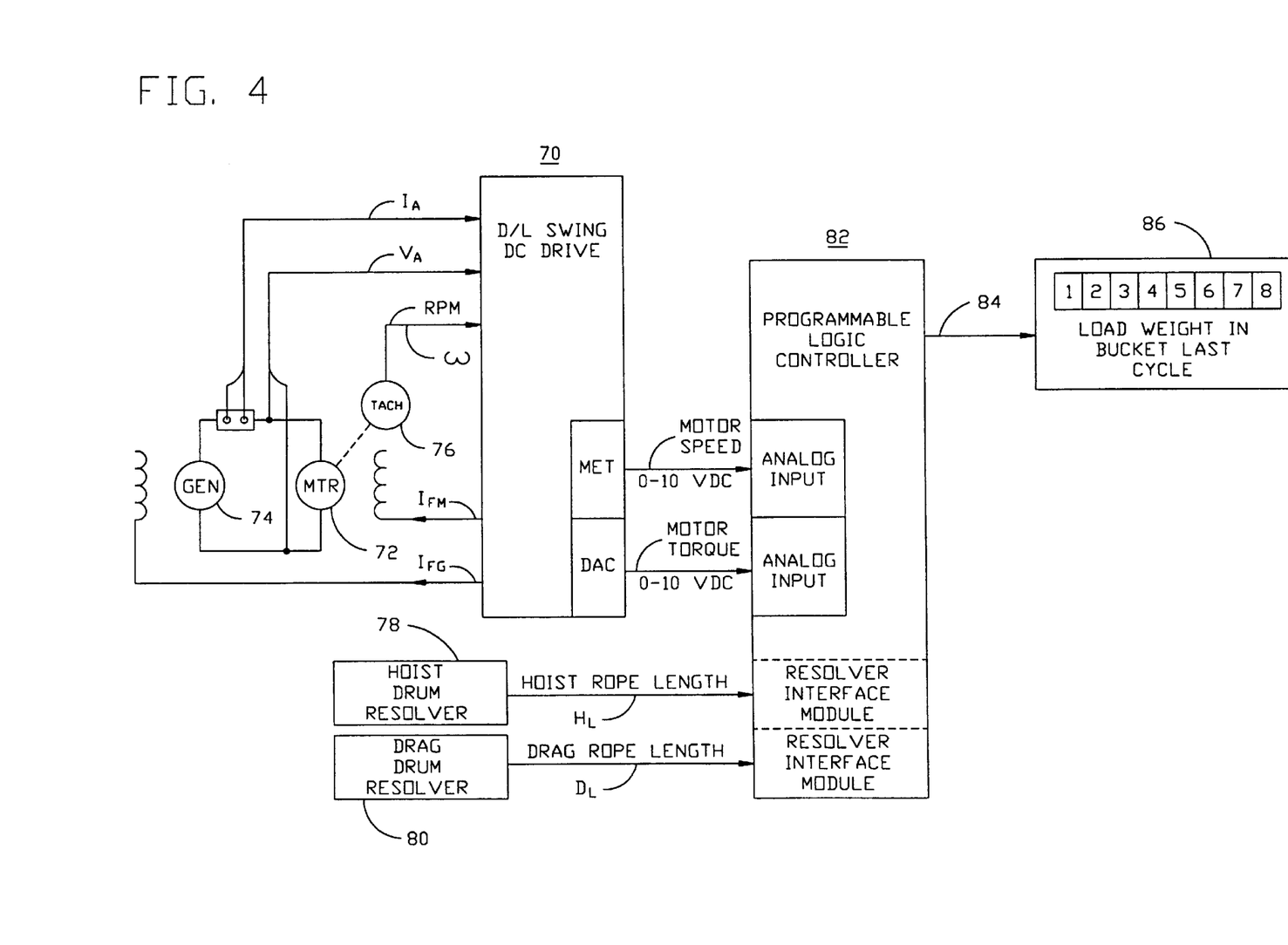
FIG. 4 is a functional block diagram of a preferred embodiment of an indirect load weighing system according to the present invention.

Referring now to FIG. 4 which depicts a functional block diagram of one preferred embodiment of the indirect suspended load weighing system according to the present invention. A swing DC drive controller 70 is connected to a DC swing drive motor 72. The DC drive controller 70 provides a motor field current signal I$_{FM}$ to the swing drive motor 72. The DC drive controller 70 also provides a generator field current signal I$_{FG}$ to a generator 74.

Armature voltage signal V$_A$ and armature current signal I$_A$ from swing drive motor 72 are provided as inputs to the drive controller 70. A tachometer 76 associated with motor 72 provides a an angular speed signal ω to the drive controller 70.

A hoist drum resolver 78 associated with a hoist drum (not shown) provides a hoist rope length signal. The hoist rope length signal has a parameter representative of the extended length H$_L$ of the hoist rope 20. Likewise, a drag drum resolver 80 associated with a drag drum (not shown) provides a drag rope length signal. The drag rope signal has a parameter representative of the extended length D$_L$ of the drag rope 24. If a shovel type excavator is used, a crowd arm resolver would replace the drag drum resolver 80; and a crowd arm signal would be provided that has a parameter representative of the extended length CR$_L$ of the crowd arm 56 (see FIG. 2).

A programmable logic controller (PLC) 82 interfaces with the drive controller 70, the hoist drum resolver 78, and the drag drum resolver 80. PLC 82 receives the hoist rope length and drag rope length signals H$_L$ and D$_L$ (CR$_L$ in the case of a shovel excavator with a crowd arm as shown in FIG. 2). PLC 82 also receives a motor speed signal from the drive controller 70. Drive controller 70 further provides a motor torque signal to PLC 82. Finally, PLC 82 outputs a displayed load weight signal 84 to a display 86. While FIG. 4 refers to a display 86, those skilled in the art will recognize that there are other means for communicating the load weight. For example, the load weight may be stored and later provided on a printout, or the load weight may be transmitted to a remote location for further processing and display.

In operation, swing drive controller 70 provides a torque determination means for determining an instantaneous torque of the swing drive motor and determining a motor torque signal having a parameter representative of the instantaneous motor torque. Those skilled in the art will recognize that swing drive controller 70 may be constructed from a wide variety of component parts. These component parts may include, for example, a microprocessor or microcontroller, a programmable logic controller, discrete components, or the like. The swing drive controller 70 computes torque in response to swing drive motor 72 armature current I$_A$ and armature voltage V$_A$ and swing drive motor 72 angular speed ω.

Referring now to FIGS. 1, 2 and 4, PLC 82 in conjunction with hoist drum resolver 78 and drag drum resolver 80, comprise radius sensing means for sensing a radius of the load bucket 18 with respect to the swing axis 30 of the excavator. PLC 82 determines a radius signal R$^2$ a first time at a first observation time/point during rotation of the bucket. PLC 82 provides the radius signal R$^2$ a second time at a second point during rotation of the bucket. In other words, PLC 82 provides a first radius signal at a first point during rotation of the bucket, and provides a second radius signal at a second point during rotation of the bucket.

Tachometer 76 provides a speed sensing means for determining an angular speed of the load bucket 22 with respect to the swing axis 30. Those skilled in the art will recognize there are alternative ways for determining angular speed, such as, for example the use of optical detectors or hall effect devices and the like. The tachometer 76 provides the angular speed signal ω a first time at a first point during rotation of the bucket. The tachometer 76 also provides the angular speed signal ω a second time at a second point during rotation of the bucket. Phrased differently, the tachometer 76 provides a first angular speed signal at the first point during rotation of the bucket, and provides a second angular speed signal at a second point during rotation of the bucket.

Swing drive controller 70 and PLC 82 further comprise computation means for computing the load weight W$_{load}$ as a function of the instantaneous torque signal, first and second radius signals, and first and second angular speed signals. Swing drive controller 70 and PLC 82 further comprise a motor power measurement circuit for providing a motor instantaneous power signal having a parameter representative of the instantaneous power of the swing drive motor 72. The torque signal equals the motor instantaneous power signal divided by the motor angular speed ω (instantaneous shaft speed).

As described above, the accuracy of the indirect suspended load weighing system may be improved by accounting for motor electrical losses. In FIG. 4, those losses can be accounted for by employing electrical loss estimation means. For example, by dividing the measured armature voltage $V_{ARM}$ and armature current $I_{ARM}$ at a time when the motor speed is near zero, the armature circuit resistance of the swing drive motor may be estimated or modeled. Thus, accuracy of the system is improved if the swing drive controller 70 further comprises a motor loss estimation circuit for providing a loss signal having a parameter representative of motor electrical losses and, correspondingly, the motor instantaneous power signal is reduced by an amount proportional to the loss signal.

As was also discussed above, the accuracy of the load measuring system may be improved by accounting for the variable inertia of the extended lengths $H_L$, $D_L$ of the hoist rope 20 and/or drag rope 24. Equation 5 illustrates a suitable approach for accomplishing this improvement.

As various changes could be made in the above constructions and methods without departing from the scope of the invention, it is intended that all matter contained in the above description, shown in the accompanying drawings, and presented in the following appendix shall be interpreted as illustrative only, and not in a limiting sense.

APPENDIX

This appendix is intended for the purposes of convenience and completeness. The appendix is not to be construed in a limiting fashion. The appendix illustrates a preferred embodiment of equations for use with a indirect load measuring system according to the present invention.

Symbol Definitions
β=Dragline boom angle with horizontal (constant)
$B_L$=Dragline boom length (constant)
$D_L$=Dragline drag rope length
$H_L$=Dragline hoist rope length
INRT1=System total inertia at start of observation period
INRT2=System total inertia at end of observation period
K=Radius of gyration of load bucket
η=Gearing mechanical efficiency
$\omega_1$=System angular speed at start of observation period
$\omega_2$=System angular speed at end of observation period
$R_1$=Radius of suspended load at start of observation period
$R_2$=Radius of suspended load at end of observation period
$R_{BP}$=Radius from swing axis to boom tip
$R_{CT1}$=Radius of suspended load during empty bucket calibration test no. 1
$R_{CT2}$=Radius of suspended load during empty bucket calibration test no. 2
$R_{CT3}$=Radius of suspended load during empty bucket calibration test no. 3
$R_F$=Dragline radius from swing axis to drag rope fairlead (constant)
$R_{FB}$=Dragline radius from drag rope fairlead to bucket
θ=Dragline drag rope angle with horizontal
$t_1$=Time at start of observation period
$t_2$=Time at end of observation period
TQ=Net Instantaneous motor torque
TQ'=Instantaneous motor torque before compensation for gearing and friction losses.
$TQ_{avg}$=Average torque during observation period
$W_{bkt}$=Weight of empty bucket (constant)
$W_{eq1}$=Weight equivalent at radius $R_{CT1}$ to total system inertia during empty bucket calibration test no. 1
$W_{eq2}$=Weight equivalent at radius $R_{CT2}$ to total system inertia during empty bucket calibration test no. 2
WKSQ=Moment of inertia of a system
$WKSQ_{mach}$=Moment of inertia of machinery and structure referred to speed of suspended load (constant)
$WKSQ1_{mach}$=Variable moment of inertia of machinery and structure measured at a first time or point during rotation
$WKSQ2_{mach}$=Variable moment of inertia of machinery and structure measured at a second time or point during rotation
$WKSQ_{ropes}$=Combined moment of inertia of the hoist and drag ropes
$WKSQ_{HR}$=Variable moment of inertia of the extended length of the hoist rope
$WKSQ_{DR}$=Variable moment of inertia of the extended length of the drag rope
$W_{load}$=Weight of bucket contents
$W_{sld}$=Weight of suspended load (empty bucket plus contents)
Wgt/foot=Weight per foot of rope Formulae $$INRT1 = WKSQ_{mach} + W_{sld} * R_1^2 \qquad [7]$$

$$INRT2 = WKSQ_{mach} + W_{sld} * R_2^2 \qquad [8]$$

$$INRT2 * \omega_2 = \int TQ * dt + INRT1 * \omega_1 \qquad [9]$$

$$(WKSQ_{mach} + W_{sld} * R_2^2) * \omega_2 = \int TQ * dt + (WKSQ_{mach} + W_{sld} * R_1^2) * \omega_1$$

$$W_{sld} * [(R_2)^2 * \omega_2 - (R_1)^2 * \omega_1] = \int TQ * dt + (WKSQ_{mach}) * (\omega_1 - \omega_2)$$

$$W_{sld} = \frac{\int TQ * dt - [(WKSQ_{mach}) * (\omega_2 - \omega_1)]}{[(R_2)^2 + K^2] * \omega_2 - [(R_1)^2 + K^2] * \omega_1} \qquad [4]$$

$$W_{load} = W_{sld} - W_{bkt} \qquad [10]$$

The indirect load weighing system of the present invention may be used during empty bucket calibration tests to determine the empty bucket weight, the combined moment of inertia of the machinery and structure, and gearing efficiency. These calibrations are necessary to isolate the suspended load moment of inertia and the weight of the load carried by the bucket. Advantageously, these otherwise difficult to measure and cumbersome to calculate constants are readily determined by using the present invention.

Equation 10 may be used with an empty bucket as part of a calibration test. In particular, these tests may be used to take measurements at three different suspended load radii to determine the machine constants $W_{bkt}$, $WKSQ_{mach}$ and η.

For an empty bucket:

$W_{load}$=0; thus $W_{sld}$=$W_{bkt}$

For constant radius during a calibration test:

$R_1$=$R_2$=$R_{ct\#}$ $WSKQ1_{ropes}$=$WSKQ2_{ropes}$=$WSKQ_{ropes}$

Let $WSKQ_{mach}$=$WSKQ_{mach}'$+$WSKQ_{ropes}$

Where $WKSQ_{mach}'$ is a moment of inertia of the machinery not including the variable inertia of the extended lengths of the hoist and drag ropes.

Let $TQ = \eta * TQ'$

Where $TQ'$ is a swing drive calculated torque before compensation for gearing and friction losses and $\eta$ is the gearing mechanical efficiency. Equation 4 under the above circumstances becomes:

$$W_{bkt} = \frac{\eta * \int TQ' * dt - WKSQ'_{mach} * (\omega_2 - \omega_1) - WKSQ_{ropes} * (\omega_2 - \omega_1)}{[(R_{ct\#})^2 + K^2] * (\omega_2 - \omega_1)} \quad [11]$$

Thus:

$$Wbkt * [(R_{ct\#})^2 + K^2] + WKSQ'_{mach} + WKSQ_{ropes} = \frac{\eta * \int TQ' * dt}{(\omega_2 - \omega_1)}$$

$$\text{Total System Inertia} = \frac{\eta * \int TQ' * dt}{(\omega_2 - \omega_1)} \quad [12]$$

Empty Bucket Calibration Test No. 1:

Let $$A1 = \frac{\int TQ' * dt}{(\omega_2 - \omega_1)} \quad [13A]$$

= Variable $W_{load}$ as measured in FIGS. 3A and 3B with Switch No. 1 in off normal position;

$B1 = (R_{CT1})^2 + K^2 =$ As measured in FIGS. 3A and 3B; [13B]

$C1 = WKSQ_{ropes} =$ As measured in FIGS. 3A and 3B [13C]

Empty Bucket Calibration Test No. 2:

Let $$A2 = \frac{\int TQ' * dt}{(\omega_2 - \omega_1)} \quad [14A]$$

= Variable $W_{load}$ as measured in FIGS. 3A and 3B with Switch No. 1 in off normal position;

$B2 = (R_{CT2})^2 + K^2 =$ As measured in FIGS. 3A and 3B; [14B]

$C2 = WKSQ_{ropes} =$ As measured in FIGS. 3A and 3B [14C]

Empty Bucket Calibration Test No. 3:

Let $$A3 = \frac{\int TQ' * dt}{(\omega_2 - \omega_1)} \quad [15A]$$

= Variable $W_{load}$ as measured in FIGS. 3A and 3B with Switch No. 1 in off normal position;

$B3 = (R_{CT3})^2 + K^2 =$ As measured in FIGS. 3A and 3B; [15B]

$C3 = WKSQ_{ropes} =$ As measured in FIGS. 3A and 3B [15C]

Thus, A1–A3, B1–B3 and C1–C3 are measured quantities. Simultaneous equations 16–18 may be solved for $\eta$, $W_{bkt}$ and $WKSQ_{mach}'$:

$A1 * \eta - B1 * W_{bkt} - WKSQ_{mach}' = C1$ [16]

$A2 * \eta - B2 * W_{bkt} - WKSQ_{mach}' = C2$ [17]

$A3 * \eta - B3 * W_{bkt} - WKSQ_{mach}' = C3$ [18]

Note that for conditions of a constant moment of inertia and a relative short time interval, equation 9 may be restated as follows:

$$\frac{TQ_{avg}}{WKSQ} = \frac{(\omega_2 - \omega_1)}{(t_2 - t_1)} = \alpha \quad [19]$$

This relationship is used to determine the torque required for bearing and windage losses as a function of speed during empty bucket coast down tests with zero motor torque.

Variable Inertia of Ropes

Note further that the accuracy of the suspended load weight determination in equation 4 may be improved by accounting for the variable inertia of the ropes. The following equation illustrates this principle. The same principle may be applied to account for the variable inertia associated with a single rope or with a hoist rope and/or a drag rope.

$$W_{sld} = \frac{\int TQ * dt - [(WKSQ2_{mach}) * \omega_2 - (WKSQ1_{mach}) * \omega_1]}{[(R_2)^2 + K^2] * \omega_2 - [(R_1)^2 + K^2] * \omega_1} \quad [5]$$

Where $WKSQ1_{mach} = WKSQ_{mach}' + WKSQ1_{ropes}$ $WKSQ2_{mach} = WKSQ_{mach}' + WKSQ2_{ropes}$ $WKSQ1_{mach}$ represents the moment of inertia of the machinery determined at a first time or point during rotation of the bucket. $WKSQ_{mach}'$ is a moment of inertia of the machinery not including the variable inertia of the extended lengths of the hoist and drag ropes. $WKSQ2_{mach}$ represents the moment of inertia of the machinery determined at a second time or point during rotation of the bucket. $WKSQ1_{ropes}$ and $WKSQ2_{ropes}$ reflect the combined moment of inertia of the extended lengths of the hoist and drag ropes computed at the first and second times/points respectively. The appropriate value for $WKSQ_{ropes}$ may be determined as shown in equations 20–22.

$WKSQ_{ropes} = WKSQ_{HR} + WKSQ_{DR}$ [20]

$$WKSQ_{HR} = \frac{\text{Wgt/foot} * H_L}{3} * [(R_{BP})^2 + R * (R + R_{BP})] \quad [21]$$

$$WKSQ_{DR} = \frac{\text{Wgt/foot} * D_L}{3} * [(R_F)^2 + R * (R + R_F)] \quad [22]$$

$WKSQ_{HR}$ reflects the variable inertia of the extended length of the hoist rope. $WKSQ_{DR}$ reflects the variable inertia of the extended length of the drag rope.

Those of skill in the art will recognize that the above noted equations may be modified accordingly for a shovel excavator. The foregoing equations are in no way intended to limit the scope of the present invention to excavators using both hoist drag ropes.

What is claimed is:

1. An indirect suspended load weight measuring system suitable for use with an excavator having a moving load bucket rotating about a swing axis, the load bucket having a load therein, and the excavator having a swing drive motor for rotating the bucket, and a hoist rope for supporting the load bucket, said system comprising:

a swing drive torque determination circuit for determining a torque of the swing drive motor and for outputting a swing drive motor torque signal having a parameter representative of an instantaneous swing drive motor torque;

a radius sensing circuit for sensing a radius of the load bucket with respect to the swing axis and providing a radius signal;

a speed sensing circuit for determining an angular speed of the load bucket with respect to the swing axis and providing an angular speed signal; and a computation circuit responsive to the instantaneous swing drive torque signal, the radius signal and the angular speed signal, said computation circuit computing a weight of the moving load.

2. The load measuring system of claim 1 wherein the swing drive torque determination circuit further comprises a motor power measurement circuit for providing a motor instantaneous power signal, and a motor shaft speed measurement circuit for providing a motor instantaneous shaft speed signal whereby the swing drive torque signal equals the motor instantaneous power signal divided by the motor instantaneous shaft speed signal.

3. The load measuring system of claim 2 wherein the motor power measurement circuit further comprises a motor electrical loss estimation circuit for providing a loss signal having a parameter representative of motor electrical losses whereby the instantaneous power signal is reduced by an amount proportional to the loss signal.

4. The load measuring system of claim 2 wherein the motor shaft speed measurement circuit comprises a tachometer.

5. The load measuring system of claim 1 having a hoist rope drum, a drag rope, and a drag rope drum wherein the radius sensing circuit further comprises a hoist rope resolver mounted on the hoist rope drum and a drag rope resolver mounted on the drag rope drum, said hoist rope resolver providing a hoist rope length signal having a parameter representative of a length of an extended portion of the hoist rope, and said drag rope resolver providing a drag rope length signal having a parameter representative of a length of an extended portion of the drag rope, whereby the computation circuit further computes the weight of the moving load as a function of the length of the extended portion of the hoist rope and the length of the extended portion of the drag rope.

6. The load measuring system of claim 1 wherein the computation circuit further computes the weight of the moving load as a function of a variable inertia of a length of the hoist rope.

7. The load measuring system of claim 1 having a drag rope wherein the computation circuit further computes the weight of the moving load as a function of a variable inertia of a length of the drag rope.

8. The load measuring system of claim 1 wherein the computation circuit computes the weight of the moving load according to the following:

$$W_{load} = W_{sld} - W_{bkt}$$

where $W_{load}$ is the weight of the load;

$W_{bkt}$ is a weight of the bucket when empty;

$W_{sld}$ is the weight of the load plus the weight of the bucket when empty;

$W_{sld}$ being further defined according to the following:

$$W_{sld} = \frac{\int TQ * dt - [(WKSQ_{mach}) * (\omega_2 - \omega_1)]}{[(R_2)^2 + K^2] * \omega_2 - [(R_1)^2 + K^2] * \omega_1}$$

where

TQ is the instantaneous swing drive motor torque;

$WKSQ_{mach}$ is a moment of inertia of the excavator;

$\omega_1$ is the angular speed of the load bucket determined at a first time;

$\omega_2$ is the angular speed of the load bucket determined at a second time;

$R_1$ is the radius of the load bucket determined at the first time;

$R_2$ is the radius of the load bucket determined at the second time; and

K is a radius of gyration of the load bucket.

9. The load measuring system of claim 8 having a drag rope and said system accounting for a variable inertia of an extended length of the hoist rope and an extended length of a drag rope according to the following:

$$W_{sld} = \frac{\int TQ * dt - [(WKSQ2_{mach}) * \omega_2 - (WKSQ1_{mach}) * \omega_1]}{[(R_2)^2 + K^2] * \omega_2 - [(R_1)^2 + K^2] * \omega_1}$$

$$WKSQ1_{mach} = WKSQ_{mach}' + WKSQ1_{ropes}$$

$$WKSQ1_{mach} = WKSQ_{mach}' + WKSQ2_{ropes}$$

where $WKSQ1_{mach}$ is a moment of inertia of the excavator determined at the first time;

$WKSQ2_{mach}$ is a moment of inertia of the excavator determined at the second time;

$WKSQ_{mach}'$ is a moment of inertia of the excavator that does not include the variable inertia of the extended lengths of the hoist and drag ropes;

$WKSQ1_{rope}$ is a combined moment of inertia of the hoist and drag ropes at the first time; and $WKSQ2_{rope}$ is a combined moment of inertia of the hoist and drag ropes at the second time.

10. The load measuring system of claim 9 wherein the combined moment of inertia of the hoist and drag ropes is determined according to the following:

$$WKSQ_{ropes} = WKSQ_{HR} + WKSQ_{DR}$$

$$WKSQ_{HR} = \frac{\text{Wgt/foot} * H_L}{3} * [(R_{BP})^2 + R * (R + R_{BP})]$$

$$WKSQ_{DR} = \frac{\text{Wgt/foot} * D_L}{3} * [(R_F)^2 + R * (R + R_F)]$$

where $WKSQ_{HR}$ is the variable inertia of the extended length of the hoist rope;

$WKSQ_{DR}$ is the variable inertia of the extended length of the drag rope;

Wgt/foot is a weight per foot of rope;

$H_L$ is the extended length of the hoist rope;

$D_L$ is the extended length of the drag rope;

$R_{BP}$ is a radius from the swing axis to an end of a boom; and $R_F$ is a dragline radius from the swing axis to a drag rope fairlead.

11. The load measuring system of claim 1 wherein the computation circuit further computes the weight of the moving load as a function of a variable angular momentum of the moving load.

12. An indirect suspended load weight measuring system suitable for use with an excavator having a moving load bucket rotating about a swing axis, the load bucket having a load therein, and the excavator having a swing drive motor for rotating the bucket, and a hoist rope for supporting the load bucket, said system comprising:

a swing drive torque determination circuit for determining an instantaneous torque of the swing drive motor and for outputing a swing drive motor torque signal having a parameter representative of the instantaneous swing drive motor torque;

a radius sensing circuit for sensing a radius of the load bucket with respect to the swing axis, said radius sensing circuit providing a first radius signal at a first point during rotation of the bucket, and providing a second radius signal at a second point during rotation of the bucket;

a speed sensing circuit for determining an angular speed of the load bucket with respect to the swing axis, said speed sensing circuit providing a first angular speed signal at the first point during rotation of the bucket, and providing a second angular speed signal at the second point during rotation of the bucket; and a computation circuit for computing a weight of the load as a function of the instantaneous swing drive torque signal, the first and second radius signals, and the first and second angular speed signals.

13. The load measuring system of claim 12 wherein the swing drive torque determination circuit further comprises a motor power measurement circuit for providing a motor instantaneous power signal, and a motor shaft speed measurement circuit for providing a motor instantaneous shaft speed signal whereby the instantaneous swing drive torque signal equals the motor instantaneous power signal divided by the motor instantaneous shaft speed signal.

14. The load measuring system of claim 13 wherein the motor power measurement circuit further comprises a motor electrical loss estimation circuit for providing a loss signal having a parameter representative of motor electrical losses whereby the instantaneous power signal is reduced by an amount proportional to the loss signal.

15. The load measuring system of claim 13 wherein the motor shaft speed measurement circuit comprises a tachometer.

16. The load measuring system of claim 12 having a hoist rope drum, a drag rope, and a drag rope drum wherein the radius sensing circuit further comprises a hoist rope resolver mounted on the hoist rope drum and a drag rope resolver mounted on the drag rope drum, said hoist rope resolver providing a hoist rope length signal having a parameter representative of a length of an extended portion of the hoist rope, and said drag rope resolver providing a drag rope length signal having a parameter representative of a length of an extended portion of the drag rope, whereby the computation circuit further computes the weight of the load as a function of the length of the extended portion of the hoist rope and the length of the extended portion of the drag rope.

17. The load measuring system of claim 12 wherein the computation circuit further computes the weight of the load as a function of a variable inertia of a length of the hoist rope.

18. The load measuring system of claim 12 having a drag rope wherein the computation circuit further computes the weight of the load as a function of a variable inertia of a length of the drag rope.

19. The load measuring system of claim 12 wherein the computation circuit further comprises an integration circuit for providing an integrated torque signal having a parameter representative of the integral of a sum of the instantaneous swing drive torque signals determined by the swing drive torque determination circuit over a load observation period defined by the first and second points during rotation of the bucket, and wherein the computation circuit further computes the weight of the load as a function of the integrated torque signal.

20. The load measuring system of claim 12 wherein the computation circuit computes the weight of the load according to the following:

$$W_{load} = W_{sld} - W_{bkt}$$

where $W_{load}$ is the weight of the load;

$W_{bkt}$ is a weight of the bucket when empty;

$W_{sld}$ is the weight of the load plus the weight of the bucket when empty;

$W_{sld}$ being further defined according to the following:

$$W_{sld} = \frac{\int TQ * dt - [(WKSQ_{mach}) * (\omega_2 - \omega_1)]}{[(R_2)^2 + K^2] * \omega_2 - [(R_1)^2 + K^2] * \omega_1}$$

where

TQ is the instantaneous swing drive motor torque;

$WKSQ_{mach}$ is a moment of inertia of the excavator;

$\omega_1$ and $\omega_2$ are the first and second angular speed signals;

$R_1$ and $R_2$ are the first and second radius signals; and

K is the radius of gyration of the load bucket.

21. The load measuring system of claim 20 having a drag rope and said system accounting for a variable inertia of an extended length of the hoist rope and an extended length of a drag rope according to the following:

$$W_{sld} = \frac{\int TQ * dt - [(WKSQ2_{mach}) * \omega_2 - (WKSQ1_{mach}) * \omega_1]}{[(R_2)^2 + K^2] * \omega_2 - [(R_1)^2 + K^2] * \omega_1}$$

$$WKSQ1_{mach} = WKSQ_{mach}' + WKSQ1_{ropes}$$

$$WKSQ2_{mach} = WKSQ_{mach}' + WKSQ2_{ropes}$$

where $WKSQ1_{mach}$ is a moment of inertia of the excavator determined at the first point during rotation of the bucket;

$WKSQ2_{mach}$ is a moment of inertia of the excavator determined at the second point during rotation of the bucket;

$WKSQ_{mach}'$ is a moment of inertia of the excavator that does not include the variable inertia of the extended lengths of the hoist and drag ropes;

WKSQ1$_{rope}$ is a combined moment of inertia of the hoist and drag ropes at the first point during rotation; and WKSQ2$_{rope}$ is a combined moment of inertia of the hoist and drag ropes at the second point during rotation.

22. The load measuring system of claim 21 wherein the combined moment of inertia of the hoist and drag ropes is determined according to the following:

$$WKSQ_{ropes} = WKSQ_{HR} + WKSQ_{DR}$$

$$WKSQ_{HR} = \frac{\text{Wgt/foot} * H_L}{3} * [(R_{BP})^2 + R*(R + R_{BP})]$$

$$WKSQ_{DR} = \frac{\text{Wgt/foot} * D_L}{3} * [(R_F)^2 + R*(R + R_F)]$$

where

WKSQ$_{HR}$ is the variable inertia of the extended length of the hoist rope;

WKSQ$_{DR}$ is the variable inertia of the extended length of the drag rope;

Wgt/foot is a weight per foot of rope;

H$_L$ is the extended length of the hoist rope;

D$_L$ is the extended length of the drag rope;

R$_{BP}$ is a radius from the swing axis to an end of a boom; and

R$_F$ is a dragline radius from the swing axis to a drag rope fairlead.

23. An indirect suspended load weight measuring system suitable for use with an excavator having a moving load bucket rotating about a swing axis, the load bucket having a load therein, and the excavator having a swing drive motor for rotating the bucket, said system comprising:

a rope supporting the load bucket, said rope having a variable extended length;

a swing drive torque determination circuit for determining a torque of the swing drive motor and for outputting a swing drive motor torque signal having a parameter representative of an instantaneous swing drive motor torque;

a radius sensing circuit for sensing a radius of the load bucket with respect to the swing axis and providing a radius signal;

a speed sensing circuit for determining an angular speed of the load bucket with respect to the swing axis and providing an angular speed signal; and a computation circuit responsive to the instantaneous swing drive torque signal, the radius signal and the angular speed signal, said computation circuit computing a weight of the moving load as a function of a variable inertia of the extended lengths of the rope.

24. The load measuring system of claim 23 wherein the computation circuit computes the variable inertia of the extended length of the rope according to the following:

$$WKSQ_{mach} = WKSQ_{mach}' + WKSQ_{rope}$$

$$WKSQ_{rope} = WKSQ_{HR} + WKSQ_{DR}$$

where

WKSQ$_{mach}$' is a total moment of inertia of the excavator;

WKSQ$_{mach}$ is a moment of inertia of the excavator that does not include the variable inertia of the extended lengths of the hoist and drag ropes;

WKSQ$_{HR}$ is the moment of inertia of the hoist rope; and

WKSQ$_{DR}$ is the moment of inertia of the drag rope.

25. An indirect suspended load weight measuring system suitable for use with an excavator having a moving load bucket rotating about a swing axis, the load bucket having a load therein, and the excavator having a swing drive motor for rotating the bucket, and a hoist rope for supporting the load bucket, said system comprising:

torque determination means for determining a torque of the swing drive motor and for outputting a swing drive motor torque signal having a parameter representative of an instantaneous swing drive motor torque;

radius sensing means for sensing a radius of the load bucket with respect to the swing axis and providing a radius signal;

speed sensing means for determining an angular speed of the load bucket with respect to the swing axis and providing an angular speed signal; and computation means responsive to the instantaneous swing drive torque signal, the radius signal and the angular speed signal, said computation means for computing a weight of the moving load as a function of a variable angular momentum of the moving load.

26. The load measuring system of claim 25 wherein the computation means further computes the weight of the moving load as a function of a variable inertia of a length of the hoist rope.

27. The load measuring system of claim 25 wherein the computation means further computes the weight of the moving load as a function of a variable inertia of a length of the drag rope.

28. An indirect suspended load weight measuring system suitable for use with an excavator having a moving load bucket rotating about a swing axis, the load bucket having a load therein, and the excavator having a swing drive motor for rotating the bucket, and a hoist rope for supporting the load bucket, said system comprising:

torque determination means for determining an instantaneous torque of the swing drive motor and for outputting a swing drive motor torque signal having a parameter representative of the instantaneous swing drive motor torque;

radius sensing means for sensing a radius of the load bucket with respect to the swing axis, said radius sensing means providing a first radius signal at a first point during rotation of the bucket, and providing a second radius signal at a second point during rotation of the bucket;

speed sensing means for determining an angular speed of the load bucket with respect to the swing axis, said speed sensing means providing a first angular speed signal at the first point during rotation of the bucket, and providing a second angular speed signal at the second point during rotation of the bucket; and computation means for computing a weight of the load as a function of the instantaneous swing drive torque signal, the first and second radius signals, and the first and second angular speed signals.

29. The load measuring system of claim 28 wherein the computation means further computes the weight of the moving load as a function of a variable inertia of a length of the hoist rope.

30. The load measuring system of claim 28 having a drag rope wherein the computation means further computes the weight of the moving load as a function of a variable inertia of a length of the drag rope.

31. An indirect suspended load weight measuring system suitable for use with an excavator having a moving load bucket rotating about a swing axis, the load bucket having a load therein, and the excavator having a swing drive motor for moving the bucket, and a hoist rope for supporting the load bucket, said system comprising:
- a swing drive torque determination circuit for determining a torque of the swing drive motor and for outputting a motor torque signal having a parameter representative of an instantaneous swing drive motor torque;
- a radius sensing circuit for sensing a radius of the load bucket with respect to the swing axis and providing a radius signal;
- a speed sensing circuit for determining an angular speed of the load bucket with respect to the swing axis and providing an angular speed signal; and
- a computation circuit responsive to the instantaneous swing drive torque signal, the radius signal and the angular speed signal, said computation circuit computing a weight of the moving load as a function of a variable angular momentum of the moving load.

* * * * *